United States Patent
Angelo (10) Patent No.: US 8,920,249 B2
(45) Date of Patent: Dec. 30, 2014

(54) HIGH ANGLE UNIVERSAL COUPLING WITH CONSTANT OR NEAR CONSTANT CHARACTERISTICS

(71) Applicant: Gerald J. Angelo, Bellevue, WA (US)

(72) Inventor: Gerald J. Angelo, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/838,114

(22) Filed: Mar. 15, 2013

(65) Prior Publication Data

US 2014/0274426 A1  Sep. 18, 2014

(51) Int. Cl.
*F16D 3/32* (2006.01)
*F16D 3/26* (2006.01)

(52) U.S. Cl.
CPC ............... *F16D 3/26* (2013.01); *Y10S 464/905* (2013.01)
USPC .......................... 464/118; 464/125; 464/905

(58) Field of Classification Search
USPC ......... 464/113–118, 125, 126, 154, 156, 904, 464/905
See application file for complete search history.

(56) References Cited

U.S. PATENT DOCUMENTS

| | | | |
|---|---|---|---|
| 2,864,246 A * | 12/1958 | Hulse | 464/117 |
| 2,945,364 A * | 7/1960 | Marquis et al. | 464/116 |
| 3,263,447 A | 8/1966 | Baker | |
| 3,411,324 A * | 11/1968 | Federline | |
| 3,429,144 A | 2/1969 | McIntosh | |
| 3,823,576 A | 7/1974 | Colletti | |
| 4,033,144 A | 7/1977 | Allen | |
| 4,075,871 A | 2/1978 | Burke | |
| 4,487,436 A | 12/1984 | Mares | |
| 4,509,932 A | 4/1985 | Weible | |
| 4,547,175 A | 10/1985 | Tangorra | |
| 5,830,071 A | 11/1998 | Castellon | |
| 7,128,653 B1 | 10/2006 | Ingalsbe | |
| 7,336,409 B2 * | 2/2008 | Sissom | |
| 2008/0280689 A1 | 11/2008 | Mazziotti | |
| 2011/0306430 A1 | 12/2011 | Wormsbaecher | |

FOREIGN PATENT DOCUMENTS

| | | | |
|---|---|---|---|
| EP | 2484929 A1 | 8/2012 | |
| GB | 345747 A | 4/1931 | |
| GB | 757468 A | 9/1956 | |
| GB | 1198608 A | 7/1970 | |
| JP | 45-603 * | 1/1970 | 464/117 |
| RU | 121538 U1 | 10/2012 | |
| SU | 941735 * | 7/1982 | 464/114 |
| WO | 84/04368 A1 | 11/1984 | |

OTHER PUBLICATIONS

International Search Report and Written Opinion mailed Jun. 19, 2014, issued in corresponding International Application No. PCT/US2014/021381, filed Mar. 6, 2014, 5 pages.

* cited by examiner

*Primary Examiner* — Gregory Binda
(74) *Attorney, Agent, or Firm* — Christensen O'Connor Johnson Kindness PLLC (57) ABSTRACT

A universal coupling is provided that aims to achieve constant velocity between the input and output shafts. The universal coupling also aims to increase the angle between input and output shafts over conventional double Cardan joints while maintaining constant velocity or near constant velocity therebetween. The universal coupling can employ a Sarrus type linkage in-between two universal joints of the Cardan type in a configuration that aims to achieve joint angles up to and including 90 degrees in the Y-Z plane, while maintaining constant velocity or near constant velocity therebetween.

10 Claims, 15 Drawing Sheets

HIGH ANGLE UNIVERSAL COUPLING WITH CONSTANT OR NEAR CONSTANT CHARACTERISTICS

BACKGROUND

Universal joints are well known devices that provide a driving connection between two shafts adapted to rotate about non-aligned axes of rotation. Universal joints have wide industrial application, and are widely used between rotatable drive shaft sections in vehicle drive train systems, steering systems, etc. One type of universal joint commonly used today is the Cardan universal joint. A Cardan universal joint is classified as a non-constant velocity type of universal joint because the instantaneous angular velocities of the driving shaft and the driven shaft will vary with the angle of rotation (although the average angular velocities for a complete revolution are equal).

A double Cardan universal joint is a near-constant velocity universal joint that is used to correct some of the deficiencies in a single Cardan universal joint. A typical double Cardan universal joint is essentially formed by two single Cardan universal joints that are connected by a unitary coupling yoke having a supporting and centering mechanism. While in wide use today, double Cardan universal joints still suffer from many drawbacks as they do not attain constant velocity and cannot provide for high angles (up to 90 degrees) between the input and output shaft.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a universal coupling is provided. The coupling includes a first universal joint, a second universal joint, a centering device associated with the first and second universal joints and configured to control the spacing therebetween and to provide at least two pivot axes to the universal coupling which lie in a common plane, and a device acting like a Sarrus linkage interconnecting the first universal joint with the second universal joint for transmitting torque therebetween.

In accordance with another aspect of the present disclosure, a universal coupling is provided. The coupling includes a first universal joint configured to be coupled to an input shaft, a second universal joint configured to be coupled to an output shaft, a centering device associated with the first and second universal joints and configured to control the spacing therebetween and to provide at least two pivot axes to the universal coupling which lie in a common plane bisecting the universal coupling, a variable length mechanism interconnecting the first universal joint with the second universal joint for transmitting torque therebetween. In some embodiments, the variable length mechanism allows linear movement of a component of the first universal joint with respect to a component of the second universal joint while an angle is formed between the input shaft and the output shaft of up to and including 90 degrees.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Generally described, examples of the present disclosure are directed to universal couplings that aim to achieve constant velocity between the input and output shafts. Some embodiments provided herein also aim to increase the angle between input and output shafts over conventional double Cardan joints while maintaining constant velocity or near constant velocity therebetween. According to aspects of the present disclosure, several examples employ a Sarrus type linkage in-between two universal joints of the Cardan type in a configuration that aims to achieve joint angles up to and including 90 degrees in the Y-Z plane, while maintaining constant velocity or near constant velocity therebetween. In some embodiments, the joint angles are selected from a group consisting of between 50 degrees and 90 degrees, between 60 degrees and 90 degrees, between 70 degrees and 90 degrees, and between 80 and 90 degrees.

In this specification "constant velocity" or a "constant velocity" characteristic refers to a characteristic wherein the instantaneous angular velocity of the input shaft is matched to the instantaneous angular velocity of the output shaft throughout a full rotation of the shafts. It is to be understood that the constant velocity characteristic is a design goal and various embodiments may achieve this characteristic to a greater or lesser degree based on parameters which can include mechanical and structural variations in the assembly.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1A:
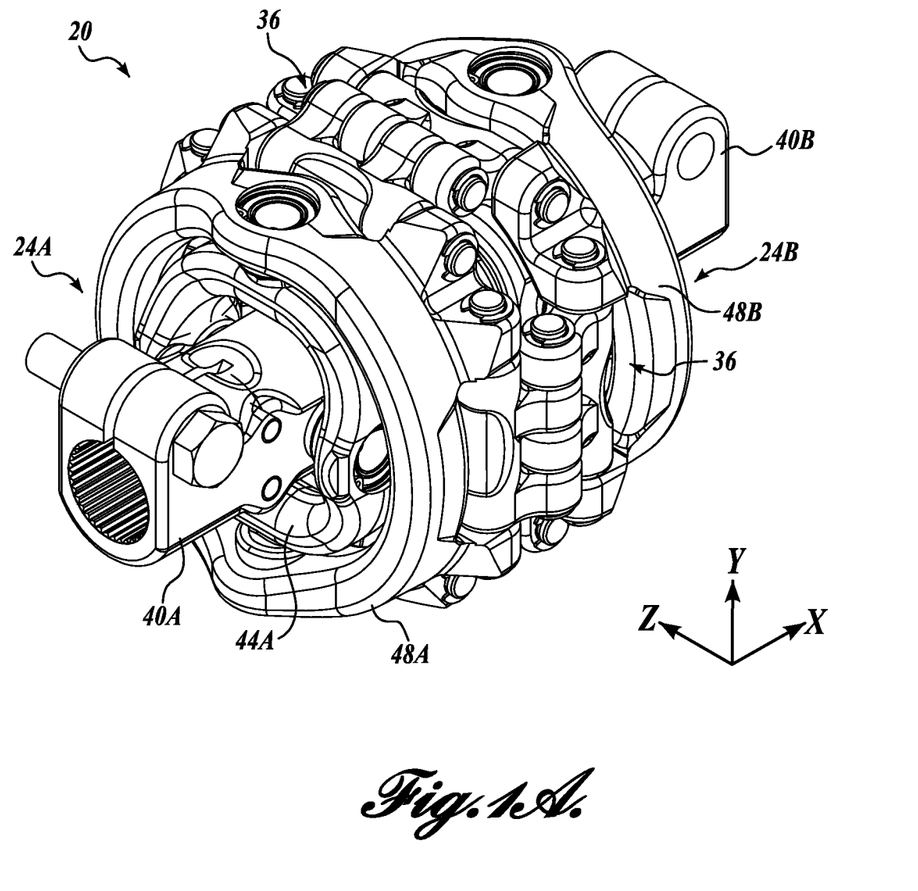
FIGS. 1A-1C are perspective, top and side views of one example of a coupling formed in accordance with aspects of the present disclosure, the coupling disposed in a first orientation.
Figure 5:
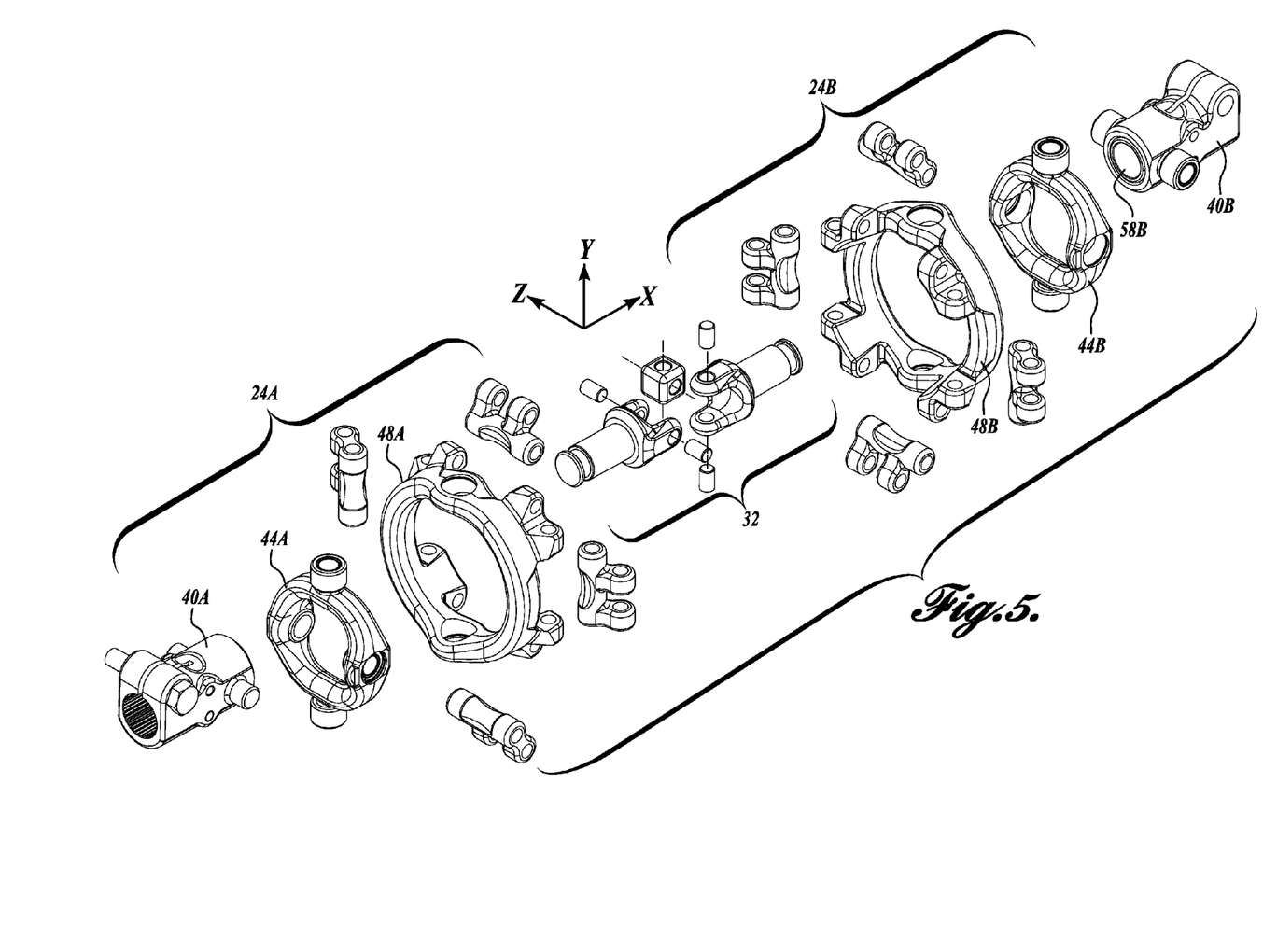
FIG. 5 is an exploded view of the coupling of FIG. 1.

Referring now to FIG. 1A, one example of a coupling, generally designated 20, in accordance with aspects of the present disclosure is shown. The coupling 20 mechanically interconnects an input shaft 22A to an output shaft 22B in such a way that torque can be transmitted from the input shaft to the output shaft (See FIG. 1C). As best shown in FIGS. 1A and 5, the coupling 20 includes first and second universal joints 24A and 24B interconnected via a centering device 32 and a variable length mechanism 36 (See FIG. 1A). In the embodiment shown, the universal joints 24A and 24B are configured as Cardan-type joints, and thus, the coupling 20 can also be referred to as a modified double Cardan joint. As will be described in more detail below, the components of the coupling 20 in some embodiments are configured and arranged to provide a constant velocity or near constant velocity between the input and output shafts with high shaft angles therebetween in the Z-Y plane.

Figure 6:
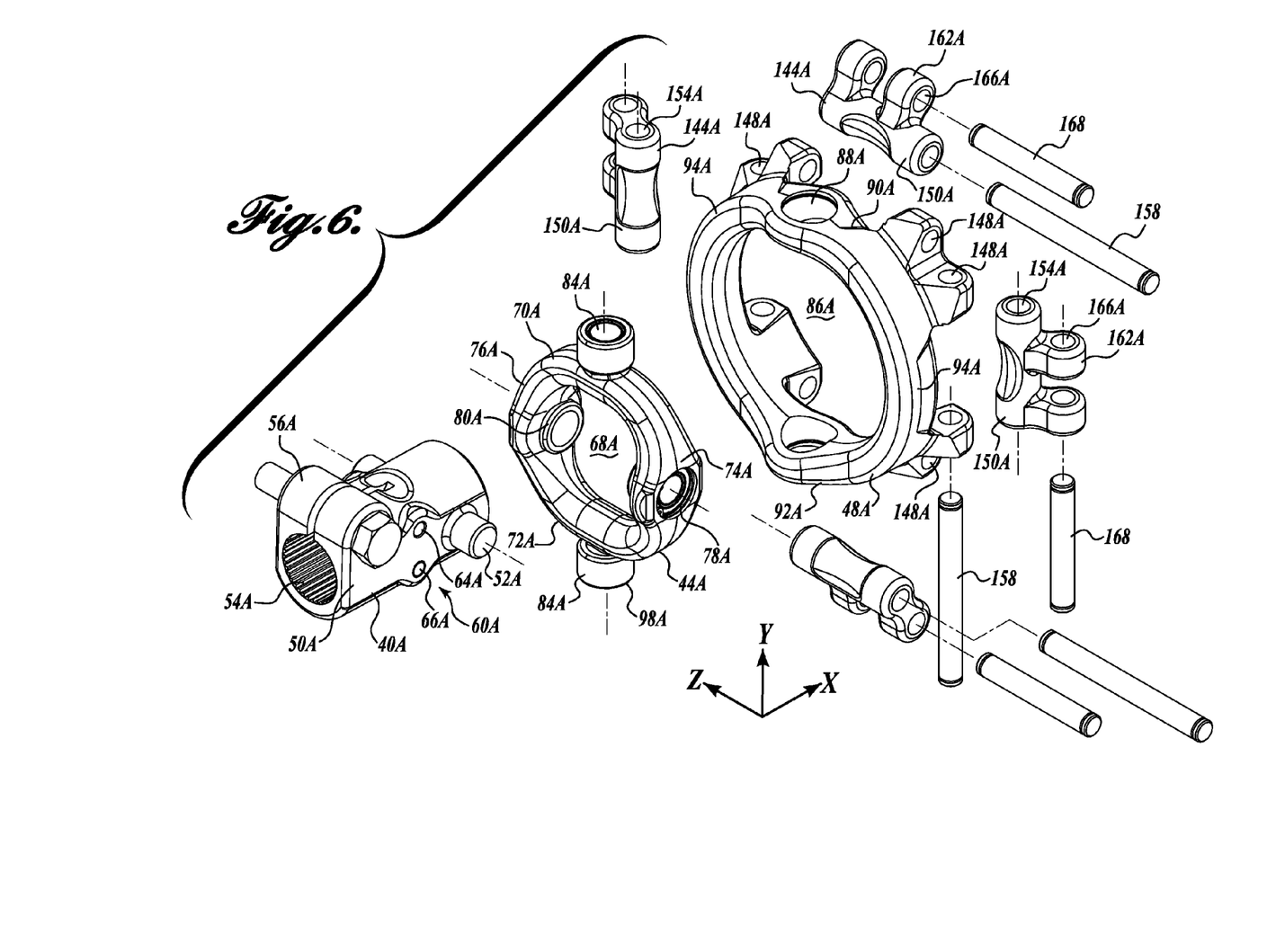
FIG. 6 is a partial exploded view of the coupling of FIG. 5, showing one example of a universal joint.

Referring now to FIGS. 5-8, the components of the coupling 20 will now be described in detail. As best shown in FIGS. 5 and 6, the first and second universal joints 24A and 24B are substantially identical in construction and operation. The construction and operation of the first and second universal joints 24A and 24B are substantially similar, and thus, for brevity of the disclosure only the first universal joint 24A will be described in more detail. It will be appreciated that like or substantially similar components of the second universal joint 24B will have like numerals designated with a "B."

In that regard, the universal joint 24A includes an input/output yolk 40A, a cross hoop 44A, and a central yolk ring 48A. The yolk 40A is generally tubular in geometry, and includes coaxial, cylindrical trunnions 52A at one end thereof. At the opposite end of the yolk 40A, there is shown alternating pairs of flats 50A. Additionally, internal splines 54 and a pinch bolt arrangement 56 are provided for selectively coupling the yolk 40A to either an input shaft or an output shaft (not shown). In embodiments when the yoke 40A is coupled to an input shat, the yolk 40B is coupled to the output shaft, and vice versa. It will be appreciated that the internal splines and a pinch bolt arrangement is only one example of a coupling between the yoke and a shaft in order to provide co-rotation, and that other shaft coupling arrangement that provide co-rotation may be practiced with embodiments of the present disclosure.

The yolk 40A also includes a centering device receiving bore 58A (bore 58B is shown more clearly in FIG. 8) and a centering device coupling 60A. The centering device coupling 60A is configured to selectively couple a portion of the centering device 32 to the yolk 40A when the centering device is received within the centering device receiving bore 58A. In the embodiment shown, the centering device coupling 60A includes first and second pin retaining holes 64A and corresponding retaining pins 66A. The first and second pin retaining holes 64A are disposed at the flats 50A and are configured to accept retaining pins 66A for interfacing with the centering device 32. In that regard, the retaining pins 66A cooperate with structure of the centering device 32 to fix the longitudinal position of the centering device 32 while allowing for rotation of the centering device 32 with respect to the yolk 40A. Bearings, such as needle bearings, sleeve bearings, and/or the like, may be disposed within the centering device receiving bore 58A in order to minimize fiction between the centering device and the yoke 40A.

The coaxial, cylindrical trunnions 52A are configured to interface with the cross hoop 44. In that regard, the cross hoop 44A includes a generally centralized opening 68A defined by a top 70A, a bottom 72A, and sides 74A and 76A. The cross hoop 44A can be generally circular or oval shaped, although other symmetrically shapes can be practiced with embodiments of the present disclosure, such as rectangular.

Coaxially aligned bores 78A are disposed in the sides 74A and 76A of the cross hoop 44 about a bisecting axis of the opening. The coaxially aligned bores 78A are arranged and configured to interface with the coaxial, cylindrical trunnions 52A in order to provide a pivoting connection between the yolk 40A and the cross hoop 44A while also allowing co-rotation thereof about the longitudinal axis (x-axis) of the yoke 40. Disposed at the top and bottom of the cross hoop 44A, there are formed or otherwise mounted coaxially aligned, cylindrical trunnions 84A oriented about a bisecting axis of the opening. In some embodiments, the common axis of the trunnions 84A are orientated perpendicular to the common axis of the bores 78A.

In the embodiment shown in FIG. 6, a hollow cylindrical bearing cup 80A can be fixedly mounted within each coaxially aligned bore 78A. The bearing cup 80A is configured to receive the end of the respective trunnion 52A of the yoke 40A. In these embodiments, needle bearings or similar means are optionally provided between the outer cylindrical surfaces of the trunnions 52A and the inner cylindrical surfaces of the bearing cups 80A to improve relative rotational movement between the trunnions 52A and the bearing cups 80A. The bearing cups 80B are shown disposed on the trunnions 52B in FIG. 6.

The coaxial, cylindrical trunnions 84A are configured to interface with the central yoke ring 48A. In some embodiments, the central yoke ring 48A is shaped to generally correspond to the shape of the cross hoop 44A, and thus, can be generally circular or oval shaped, although other shapes can be practiced with embodiments of the present disclosure, such as rectangular. The central yoke ring 48A in some embodiments is generally symmetrical, and includes a generally centralized opening 86A defined by a top 90A, a bottom 92A, and sides 94A. The opening 86A of the central yoke ring 48 is sized to receive the cross hoop 44A therein. Disposed in the top and bottom of the central yoke ring 48A about a bisecting axis of the opening 86A are coaxially aligned bores 88A. The coaxially aligned bores 88A are configured and arranged to interface with the coaxial, cylindrical trunnions 84A in order to provide a pivoting connection about the Y-axis between the cross hoop 44A and the central yoke ring 48A while also allowing co-rotation thereof (about the X-axis).

Again, in some embodiments, a hollow cylindrical bearing cup 98A can be fixedly mounted within each coaxially aligned bore 88A. The bearing cup 98A is configured to receive the end of the respective trunnion 84A of the cross hoop 44A. In these embodiments, needle bearings or similar means are optionally provided between the outer cylindrical surfaces of the trunnions 84A and the inner cylindrical surfaces of the bearing cups 98A to improve relative rotational movement between the trunnions and the bearing cups.

Figure 10:
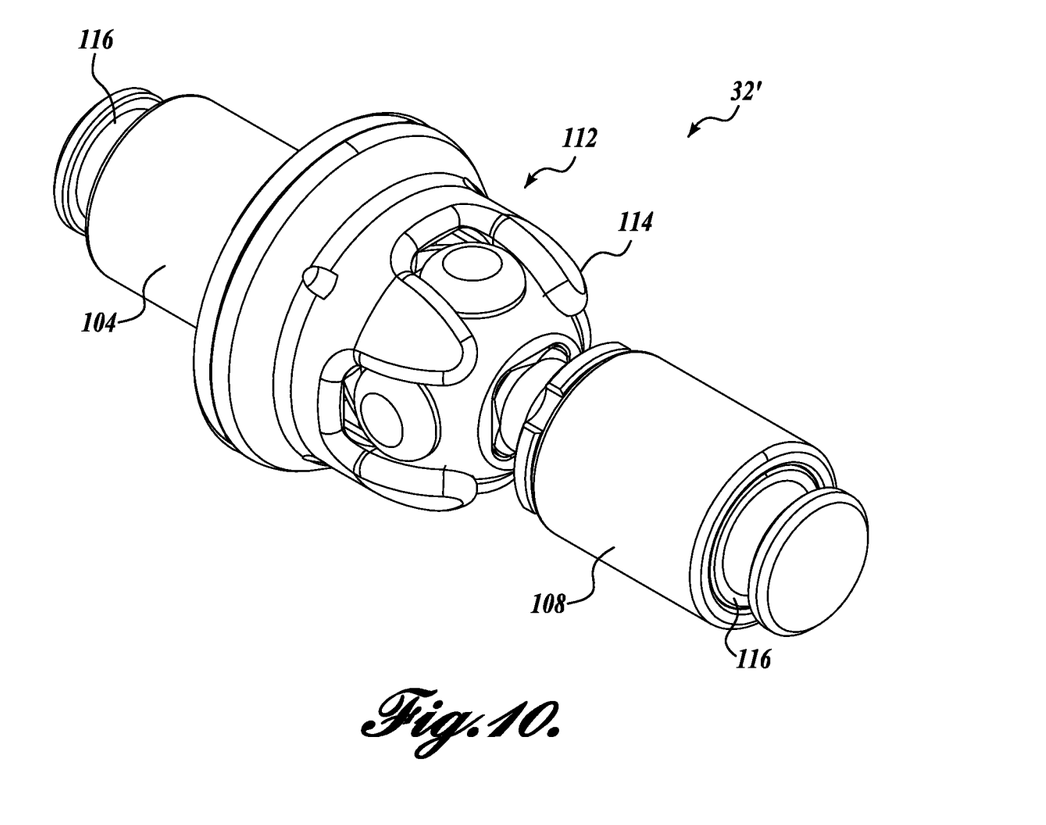
FIG. 10 is a perspective of another example of a centering device formed in accordance with aspects of the present disclosure.

As was briefly stated above, the coupling 20 includes a centering device 32 coupled between the first and second universal joints 24A and 24B. In the embodiment shown in FIGS. 5 and 7, the centering device 32 includes a universal joint acting like a Cardan type, having first and second pivot yolks 104 and 108, and a cross block 110. In another embodiment, the centering device 32' includes a spherical joint 112 with a ball-and-socket arrangement 114, as best shown in FIG. 10. In use, as will be described in more detail below, the centering device 32 constrains both joints 24A and 24B and holds them in a fixed geometric relationship to each other such that the input and output shafts form equal angles with respect to a point known herein as the coupling center.

Figure 7:
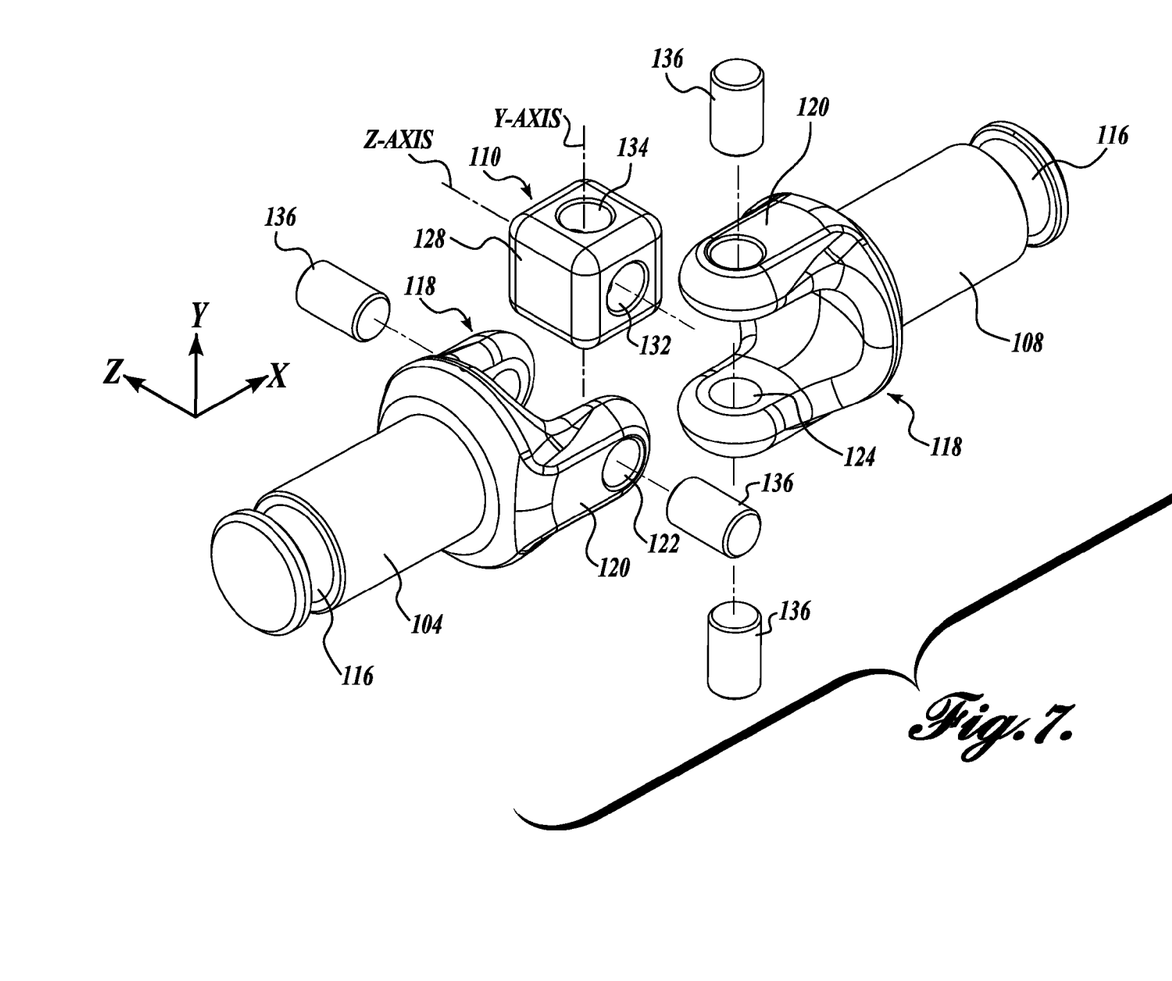
FIG. 7 is a partial exploded view of the coupling of FIG. 5, showing one example of a centering device.

Still referring to FIGS. 5 and 7, the first and second pivot yolks 104 and 108 of the centering device 32 are substantially identical in construction and operation. Each pivot yolk 104 and 108 includes a circumferential groove 116 at one end and U-shaped yolks 118 at the opposite end. As was briefly mentioned above, the circumferential groove ends of the first and second pivot yolks 104 and 108 are slidably received within the centering device receiving bores 58A and 58B of the universal joints 24A and 24B, respectively. Once received, the longitudinal position of the pivot yolks 104 and 108 are fixed therein by retaining pins 66. However, the retaining pins 66 cooperate with the circumferential grooves to allow rotation of the centering device 32 with respect to the yolks 40. As a result, the centering device 32 is not considered a torque transmitting device. The opposing forks 120 of the pivot yolks 104 and 108 include coaxially aligned bores 122 and 124, respectively.

Still referring to FIGS. 5 and 7, the cross block 110 includes a central body portion 128 with first and second pairs of opposing, cylindrical bores 132 and 134. The bores 132, 134 are oriented in a single plane, are positioned at right angles relative to one another, and have a common intersection at the center of the central body portion 128.

As assembled, the first pivot yoke 104 can be pivotally coupled to the first pair of bores 132 of the cross block 110 via pivot pins or pintles 136, and the second pivot yoke 108 can be pivotally coupled to the second pair of bores 134 of the cross block 110 via pivot pins or pintles 136. As a result, all of the pivot axes defined by the pivot pins or pintles 136 lie in a common plane defined by the Y and Z axes, which are perpendicular to the longitudinal axis (x-axis) of the coupling 20. The point of intersection of the axes of the input and output shafts (and the input/output yokes 40) lies on this common plane and can be referred to as the coupling center or the geometric center.

Figure 11:
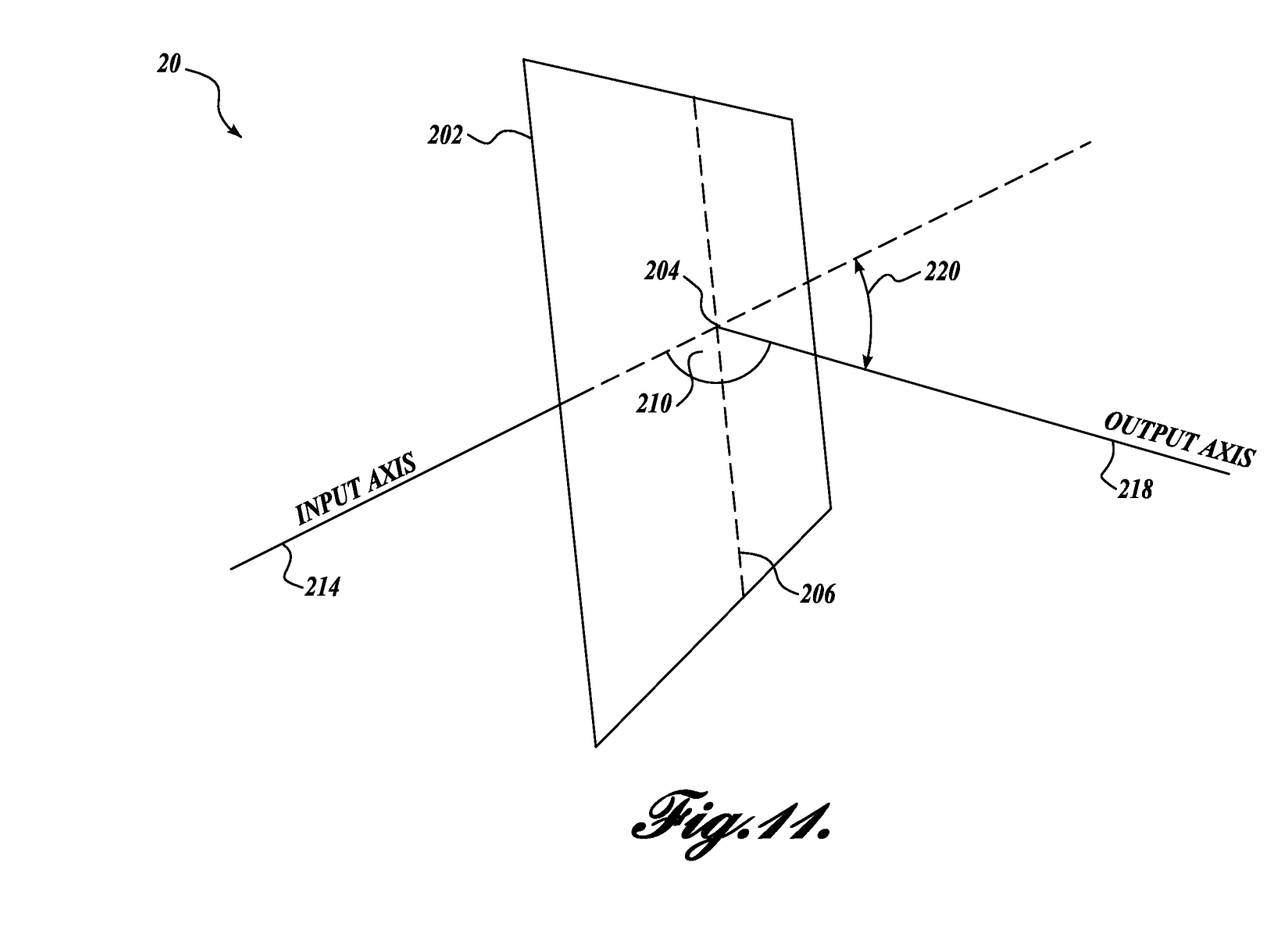
FIG. 11 is a graphical depiction of the common plane and related axes associated with some examples of the coupling of the present disclosure.

FIG. 11 is a schematic representation of the common plane 202 and coupling center 204, as described above. As best shown in FIG. 11, the common plane is that plane which lies on the bisector 206 of the angle 210 between the input axis 214 and the output axis 218 of the coupling, such as coupling 20. More specifically, the common plane 202 is defined to lie at right angles to the plane defined by the input and output axes 214, 218. In the particular case of FIG. 11, if it is taken that the input axis 214 and output axis 218 lie in the plane of the page then the common plane 202 will lie at right angles to the page. The common plane is sometimes referred to as the "homokinetic" plane when referencing constant velocity joints.

It will be appreciated that in some embodiments, the first and second pivot yolks 104 and 108 are configured such at the pivots yolks 104 and 108 can pivot up to and including 90 degrees with respect to each other along the Y axis and/or the Z axis about the coupling center. Further, it will be appreciated that in some embodiments, as the first and second pivot yolks 104 and 108 pivot up to and including 90 degrees with respect to each other along the Y axis and the Z axis about the coupling center, the yokes 40A and 40B pivot up to and including 90 degrees along the Y axis and the Z axis.

Figure 2A:
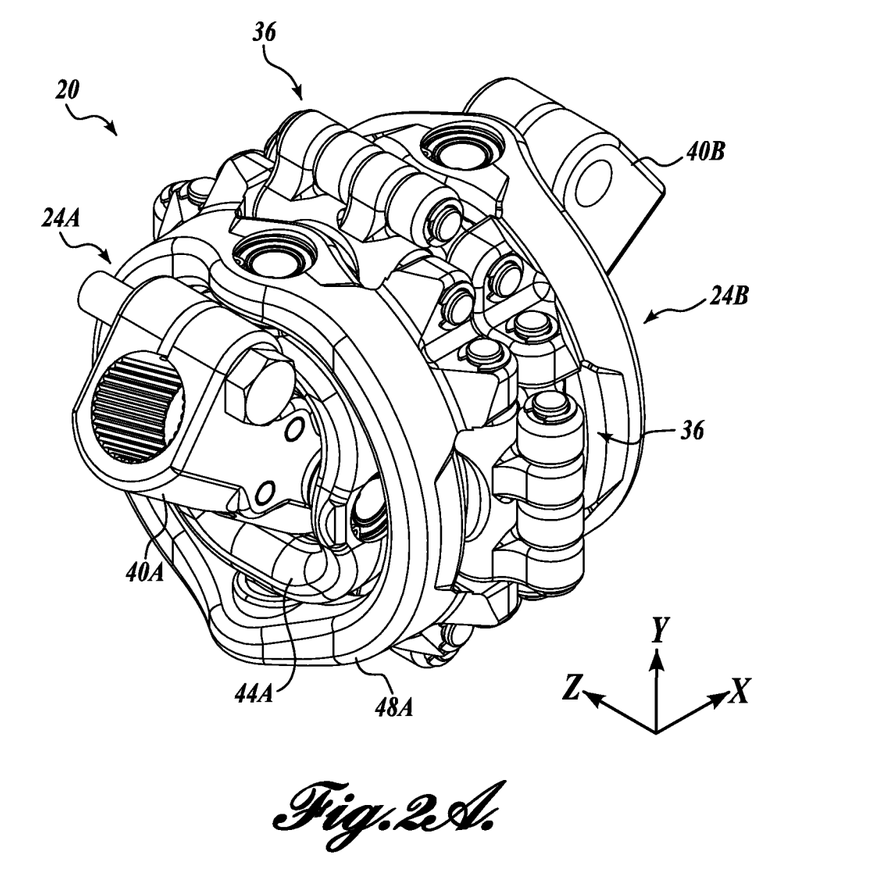
FIGS. 2A-2C are perspective, top and side views of the coupling of FIG. 1 in a second orientation.
Figure 2B:
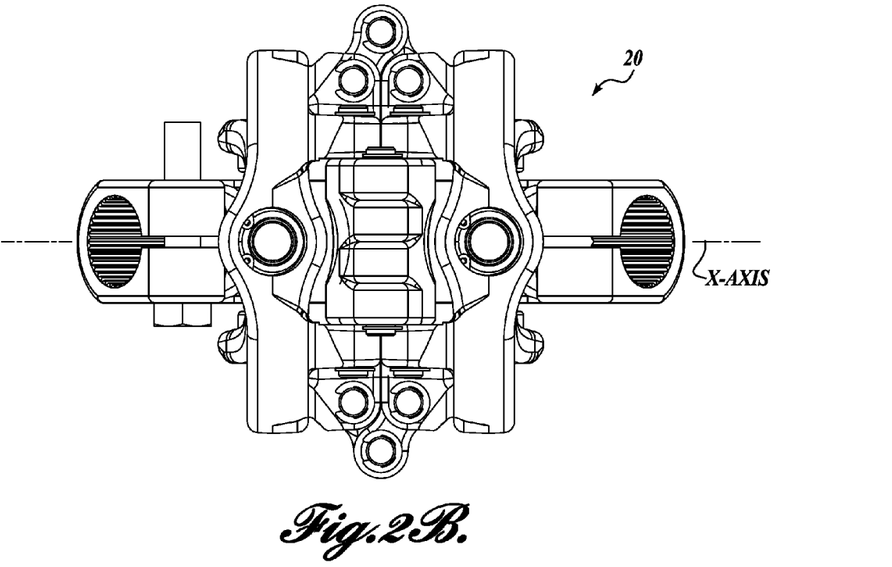
Figure 2C:
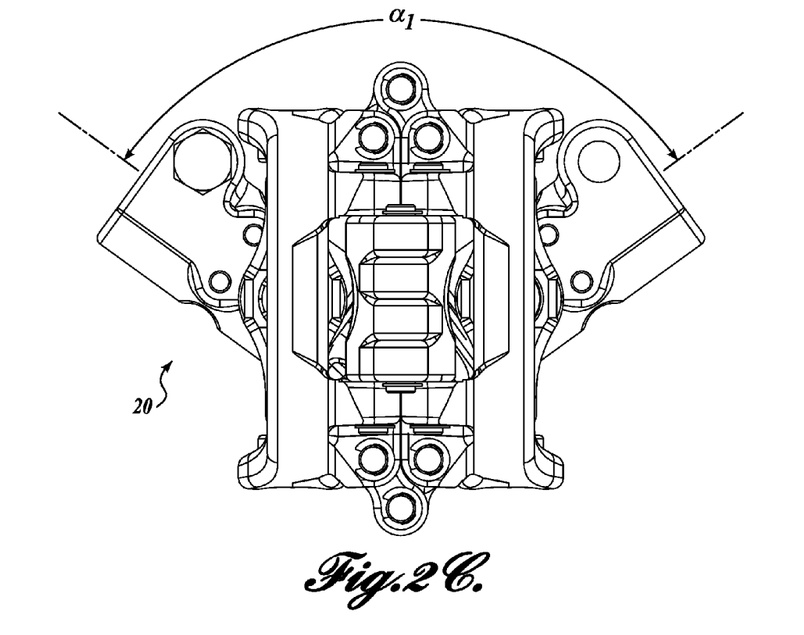
Figure 3A:
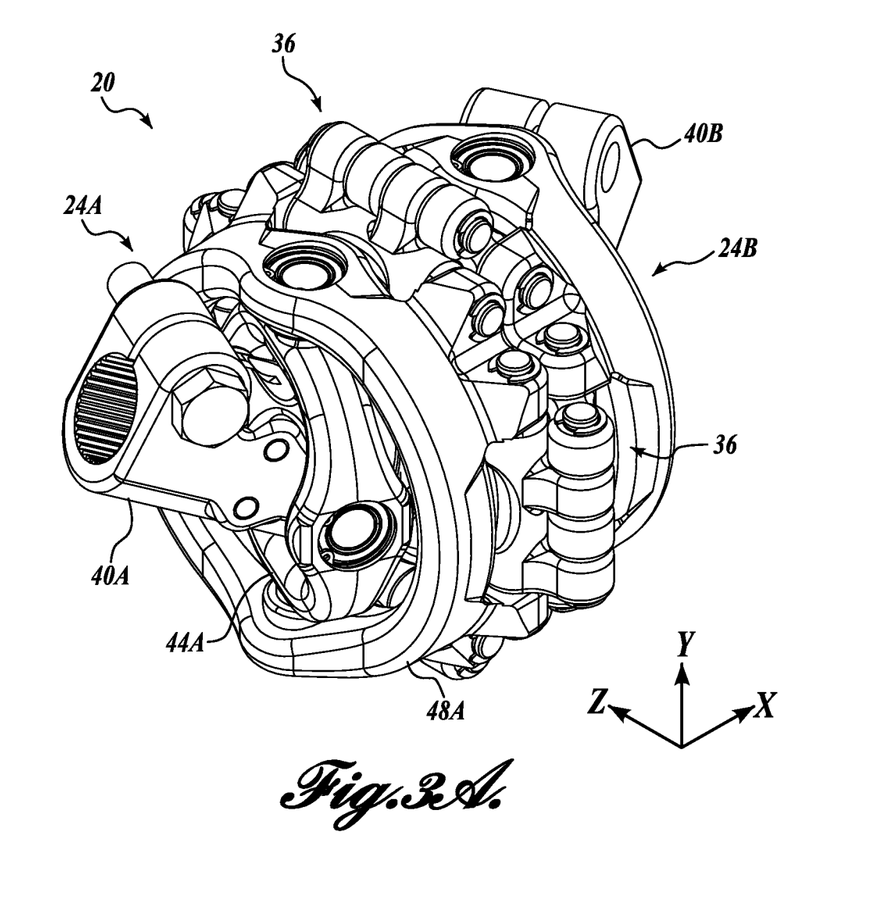
FIGS. 3A-3C are perspective, top and side views of the coupling of FIG. 1 in a third orientation.
Figure 3B:
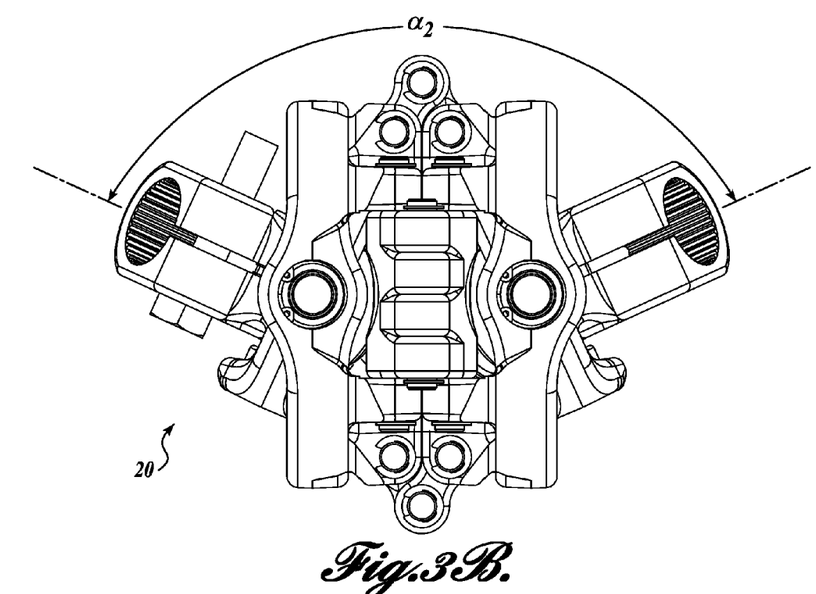
Figure 3C:
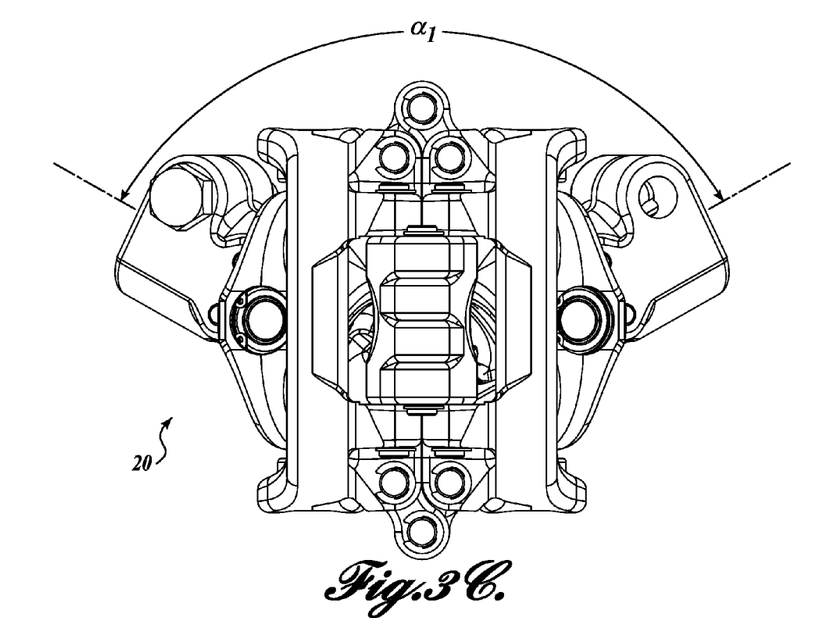
Figure 4A:
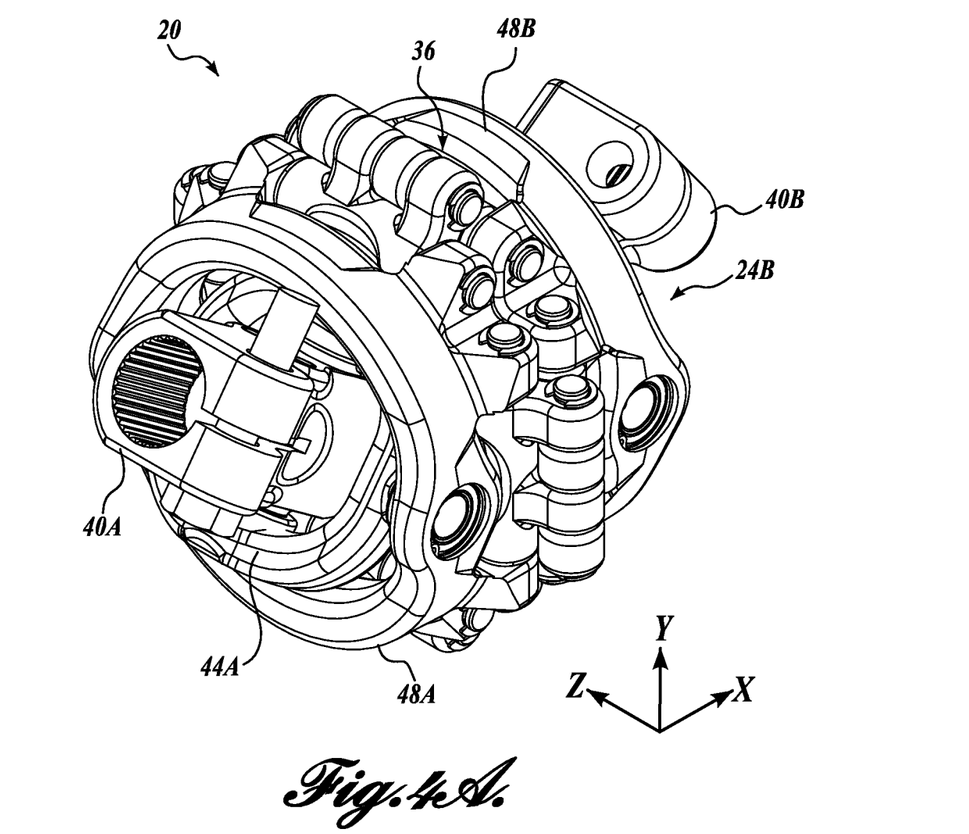
FIGS. 4A-4C are perspective, top and side views of the coupling of FIG. 1 in a fourth orientation.
Figure 4B:
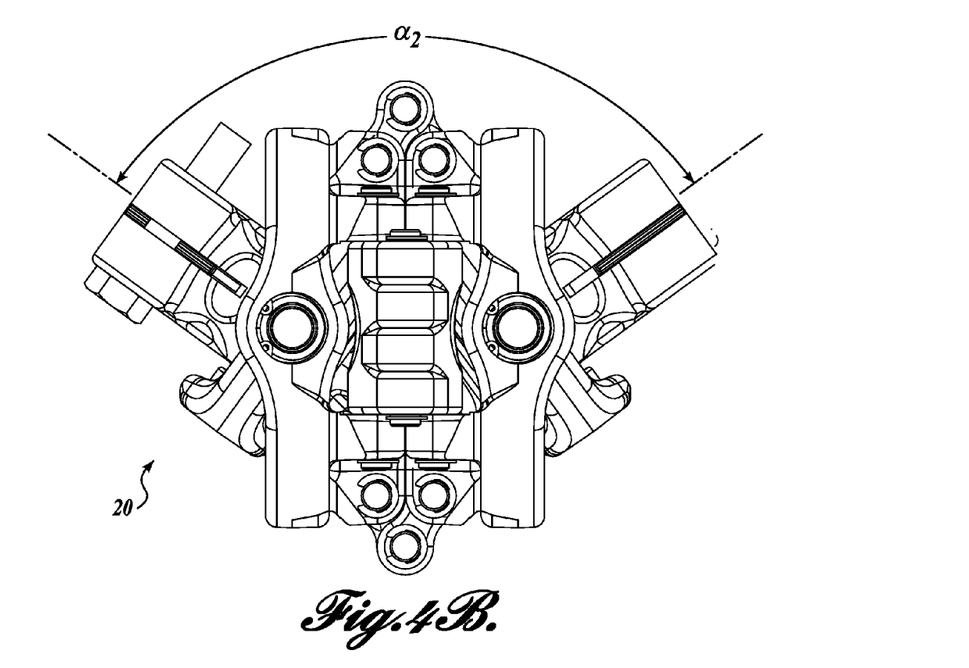
Figure 4C:
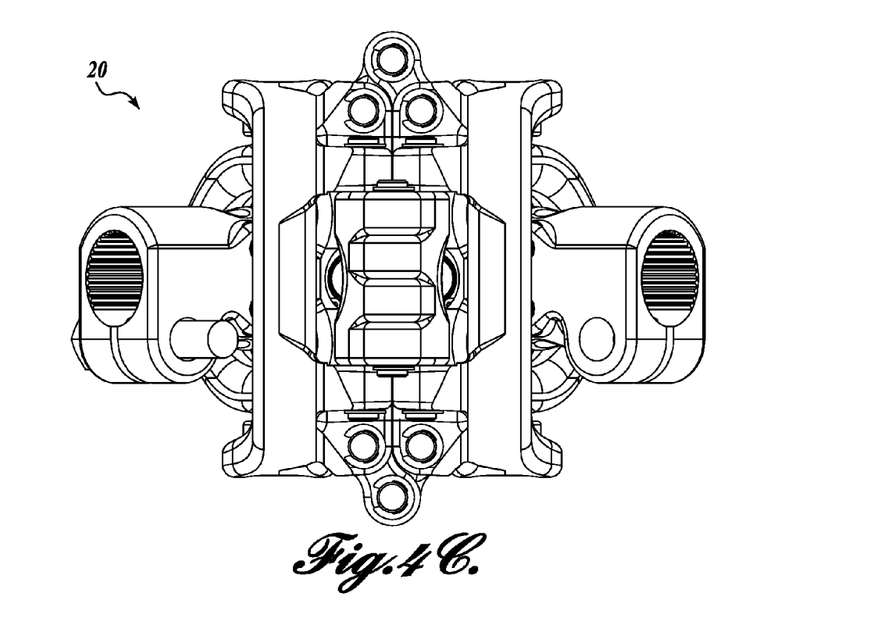

Pivoting about the Y axis can be referred to herein as creating an "off-axis" angle, denoted $\alpha_2$, between the input shaft and the output shaft as it creates an angle with the X-axis. Pivoting about the Z axis can be referred to herein as creating an "on-axis" angle, denoted $\alpha_1$, between the input shaft and the output shaft as it creates an angle that is parallel with the X-axis. FIGS. 3B and 4B illustrate top views of the coupling 20 showing an "off-axis" angle $\alpha_2$ between the input shaft and the output shaft. FIG. 3B is a top view of the coupling showing an "off-axis" angle $\alpha_2$ between the input shaft and the output shaft, and showing an on-axis angle $\alpha_1$ therebetween about the Z-axis. FIGS. 2B and 2C illustrate top and front views, respectively, of the coupling 20 showing an "on-axis" angle $\alpha_1$ between the input shaft and the output shaft.

Figure 1B:
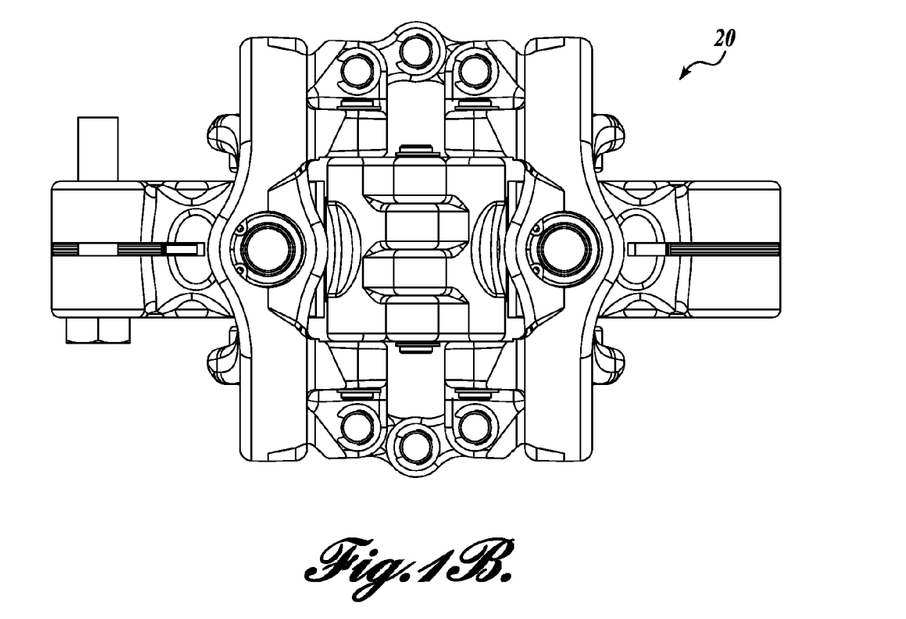
Figure 1C:
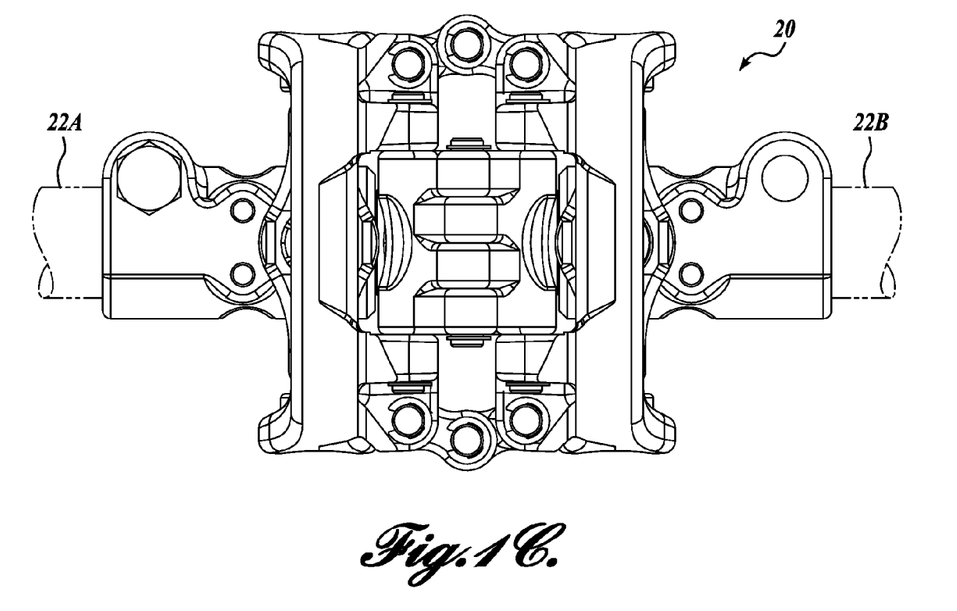

To transfer the rotation of the first universal joints 24A to the second universal joints 24B, the central yolks rings 48 are coupled via a variable length mechanism 36, as shown in FIG. 1. Because of the coupling center and the common plane provided by the centering device 32, the variable length mechanism 36 is configured to: 1) cause co-rotation between the central yolk rings 48; and 2) allow variable length linear movement between the central yolk rings 48 as the coupling 20 pivots about the Y and/or Z axis that define the common plane 202. In some embodiments, the mechanism is configured as a Sarrus-type linkage. A Sarrus-type linkage is any type of linkage that allows rectilinear movement between the central yolk rings 40 of the first and second universal joints 24A, 24B when the coupling 20 pivots about the common plane.

Figure 8:
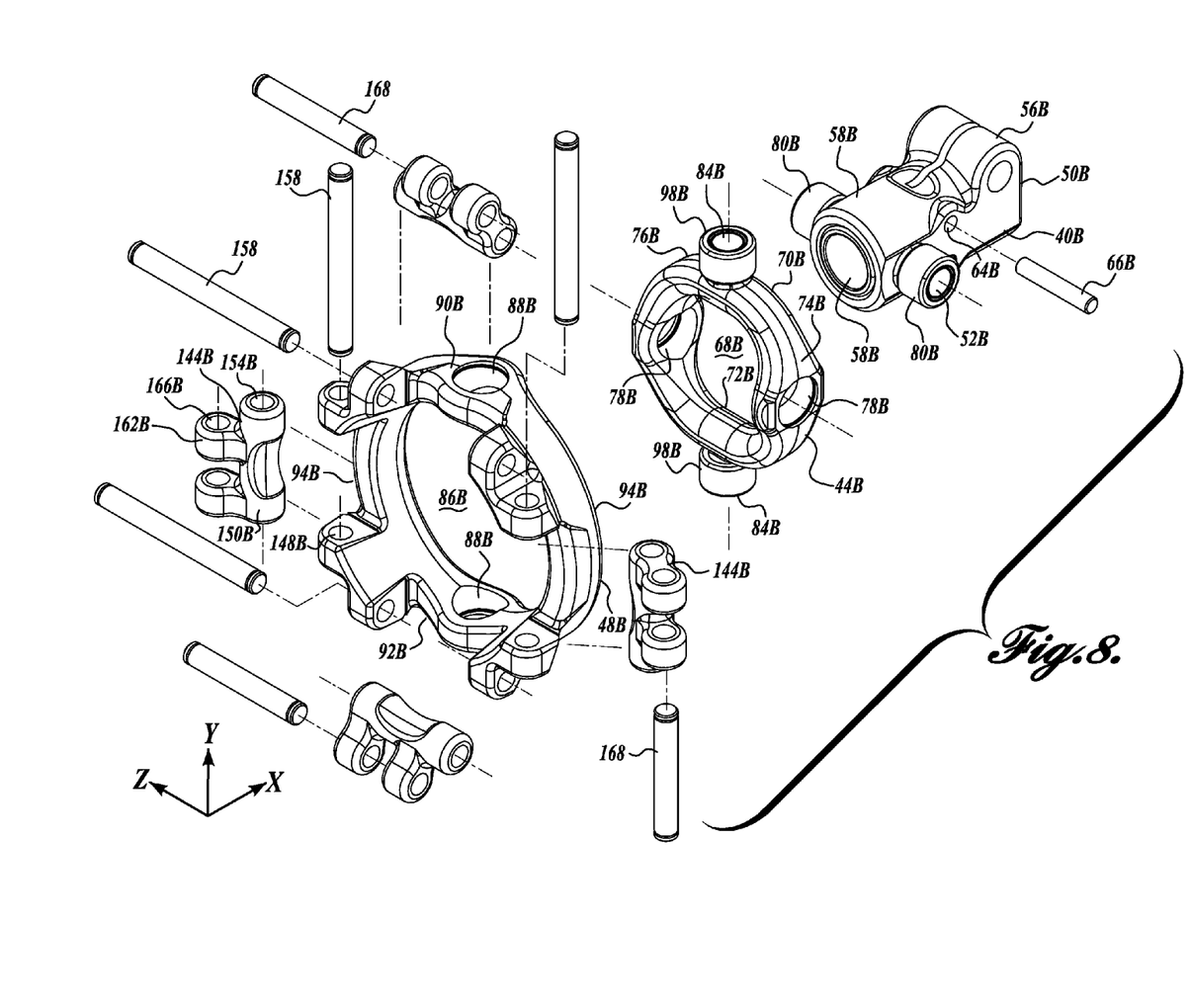
FIG. 8 is a partial exploded view of the coupling of FIG. 5, showing one example of a second universal joint.

FIGS. 1A, 5, 6, and 8 illustrate one type of Sarrus-type linkage that may be practiced with the present disclosure. As best shown in FIGS. 5, 6, and 8, the Sarrus-type linkage includes four hinge links 144 pivotally coupled to each central yolk ring 48. In that regard, each central yolk ring 48 includes four pairs of coaxially aligned bores 148 disposed at right angles to each other. In the embodiment shown, each pair of bores 148 are defined by a series of bosses provided on the center facing side of the central yolk ring 48. Correspondingly, each hinge link 144 includes a pair of lugs in the form of hinge barrels 150. The bores 154 of the hinge barrels 150 are configured and arranged to align with the respective pair of aligned bores 148. Once aligned, the hinge links 144 can be pivotally coupled to the central yolk rings 48 via pivot pins or pintles 158.

To complete the assembly of the Sarrus-type linkage, the hinge links 144A of the first universal joint 24A are pivotally coupled to the corresponding hinge links 144B of the second universal joint 24B. In that regard, each hinge link 144 on the end opposite the hinge barrels 150 includes a pair of lugs in the form of hinge barrels 162. The bores 166 of the hinge barrels 162 of the hinge links 144A are configured and arranged to align with the respective pair of aligned bores 166 of the hinge barrels 162 of the corresponding hinge links 144B. Once aligned, the hinge links 144 can be pivotally coupled together via a pivot pin or pintle 168. In some embodiments, the hinge links 144 are sized and configured such that the pivot axes of the coupled hinge links lie in the common plane 202 of the centering device 32. As a result, the center yolk rings 48 can move linearly in a controlled manner along the X-axis as the hinge links 144 pivot about the common plane 202.

Figure 9:
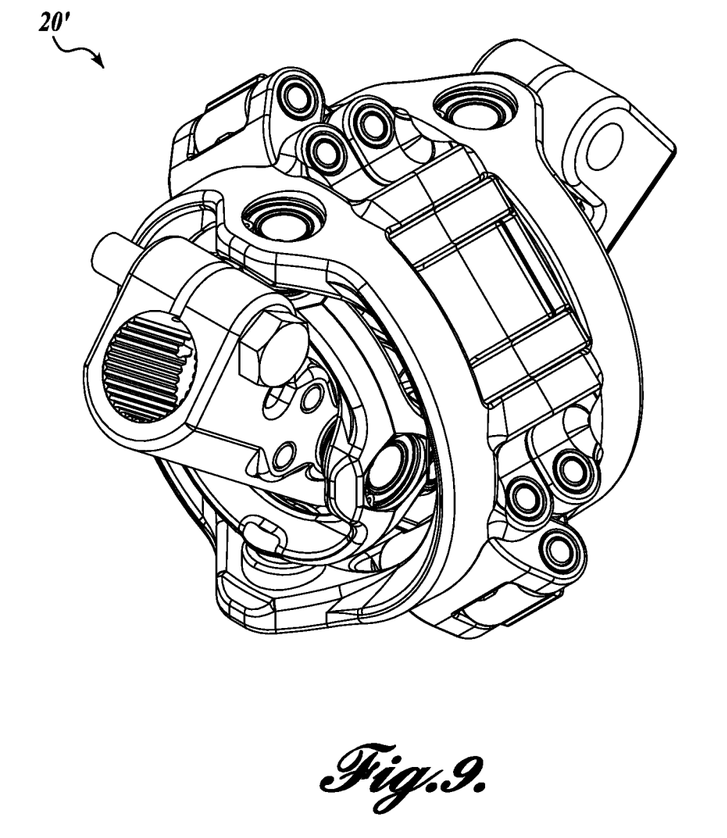
FIG. 9 is a perspective of another example of a coupling formed in accordance with aspects of the present disclosure.

In the embodiment shown in FIGS. 1A and 5, four hinge links were employed at right angles to one another at each central yolk ring 48. In some embodiment, the four hinge links are positioned to correspond to the top, bottom, and sides of the central yoke ring 48. In other embodiments, the hinge links can be positioned at the so called corners of the central yoke ring 48, as shown in FIG. 9. It will be appreciated that a linkage with two hinge links pivotally coupled at right angles can be employed in some embodiments. In other embodiments, three hinge links equal-angularly disposed (i.e., forming an equilateral triangle) may be used. Moreover, different configurations of the hinge links can be practiced with embodiments of the present disclosure, as best shown in FIG. 9.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A universal coupling having a longitudinal axis, comprising:
 a first universal joint;
 a second universal joint;
 a centering device associated with the first and second universal joints and configured to control the spacing therebetween and to provide at least two pivot axes to the universal coupling which lie in a common plane, wherein the centering device includes one of a spherical joint and a Cardan joint; and
 a linkage assembly that couples the first universal joint to the second universal joint for transmitting torque therebetween, wherein the linkage assembly includes
  first and second hinge links hingedly coupled to a portion of the first universal joint; and
  third and fourth hinge links hingedly coupled to a portion of the second universal joint, wherein the first and second hinge links are hingedly coupled about first and second axes to the third and fourth hinge links, respectively, such that the first axis is co-planar with the second axis and both first and second axes are disposed orthogonal to the longitudinal axis of the universe coupling.

2. The universal coupling of claim 1, wherein the centering device is a Cardan joint.

3. The universal coupling of claim 1, wherein the centering device includes a spherical joint.

4. The universal coupling of claim 3, wherein the spherical joint includes a socket shaft configured to interface with a ball shaft.

5. The universal coupling of claim 1, wherein the first universal joint and the second universal joint each act as a Cardan joint.

6. The universal coupling of claim 1, wherein the first universal joint acts as a Cardan joint and includes an input shaft yolk adapted to be coupled to an input shaft, and wherein the second universal joint acts as a Cardan joint and includes an output shaft yolk adapted to be coupled to an output shaft, wherein the configuration of the device provides an angle between the input and output yolks about the two perpendicular axes, the angle selected from a group consisting of between 50 degrees and 90 degrees, between 60 degrees and 90 degrees, between 70 degrees and 90 degrees, and between 80 and 90 degrees.

7. The universal coupling of claim 1, wherein the common plane bisects the universal coupling.

8. The universal coupling of claim 1, wherein the universal coupling is symmetrical about the common plane.

9. The universal coupling of claim 1, wherein the first and second axes are disposed at right angles.

10. A universal coupling, comprising:
 a first universal joint configured to be coupled to an input shaft;
 a second universal joint configured to be coupled to an output shaft;
 a centering device associated with the first and second universal joints and configured to control the spacing therebetween and to provide at least two pivot axes to the universal coupling which lie in a common plane bisecting the universal coupling, wherein the centering device includes one of a spherical joint and a Cardan joint; and
 a variable length mechanism interconnecting the first universal joint with the second universal joint for transmitting torque therebetween, the variable length mechanism allowing linear movement of a component of the first universal joint with respect to a component of the second universal joint while an angle is formed between the input shaft and the output shaft of up to and including 90 degrees,
 wherein the variable length mechanism includes
  first and second hinge links hingedly coupled to the first universal joint; and
  third and fourth hinge links hingedly coupled to the second universal joint, wherein the first and second hinge links are hingedly coupled about first and second axes to the third and fourth hinge links, respectively, such that the first axis is orthogonal to and co-planar with the second axis and both first and second axes are disposed orthogonal to the longitudinal axis of the universe coupling.

* * * * *